United States Patent
Kaselow et al.

(10) Patent No.: US 6,220,848 B1
(45) Date of Patent: Apr. 24, 2001

(54) INJECTION MOULDING DIE LOCKING AND OPENING DEVICE

(75) Inventors: Thorsten Kaselow, Hemer; Christian Schulz, Balve, both of (DE)

(73) Assignee: Optimel Schmelzgusstecgnik GmbH & Co. KG, Iserlohn (DE)

( * ) Notice: Subject to any disclaimer, the term of this patent is extended or adjusted under 35 U.S.C. 154(b) by 0 days.

(21) Appl. No.: 09/297,893

(22) PCT Filed: Oct. 29, 1997

(86) PCT No.: PCT/EP97/05977

§ 371 Date: May 28, 1999

§ 102(e) Date: May 28, 1999

(87) PCT Pub. No.: WO98/19849

PCT Pub. Date: May 14, 1998

(30) Foreign Application Priority Data

Nov. 7, 1996 (DE) ................................. 196 45 860

(51) Int. Cl.⁷ .................................................. B29C 45/64
(52) U.S. Cl. ................... 425/443; 425/451.7; 425/594; 425/595
(58) Field of Search ..................... 425/594, 595, 425/450.1, 451.7, 451.9, 443, DIG. 121, DIG. 5

(56) References Cited

U.S. PATENT DOCUMENTS

| | | | |
|---|---|---|---|
| 2,115,590 | * 4/1938 | Ryder | 425/595 |
| 2,370,622 | * 3/1945 | Gastrow | 425/595 |
| 3,132,378 | * 5/1964 | Johannigman | 425/78 |
| 3,259,942 | * 7/1966 | Politis | 425/525 |
| 3,353,221 | 11/1967 | Barnett et al. | 18/43 |
| 3,743,469 | * 7/1973 | Gibbons | 425/450 |
| 4,184,835 | * 1/1980 | Talbot | 425/577 |
| 4,265,610 | * 5/1981 | Dorsey | 425/411 |
| 4,535,689 | * 8/1985 | Putkowski | 100/214 |
| 4,747,982 | * 5/1988 | Nakatsukasa et al. | 264/40.5 |
| 4,768,946 | * 9/1988 | Maruyama et al. | 425/595 |
| 4,842,506 | 6/1989 | Coutier | 425/193 |
| 4,867,672 | * 9/1989 | Sorenson | 425/577 |
| 5,112,207 | * 5/1992 | Pinsonneault | 425/192 R |
| 5,456,588 | 10/1995 | Yonekubo et al. | 425/183 |
| 5,460,763 | * 10/1995 | Asai | 264/107 |
| 5,580,587 | * 12/1996 | Leonhartsberger et al. | 425/183 |
| 6,030,569 | * 2/2000 | Yu | 264/272.17 |

FOREIGN PATENT DOCUMENTS

| | | |
|---|---|---|
| 0 286 553 | 10/1988 | (EP) . |
| 0 488 261 | 6/1992 | (EP) . |
| 63-42828 | 2/1988 | (JP) . |
| 63-174773 | 7/1988 | (JP) . |

OTHER PUBLICATIONS

Research Disclosure, No. 250, (1985) XP002059366.
Patent Abstracts of Japan, vol. 12, No. 442 (1988).
Patent Abstracts of Japan, vol. 12, No. 260 (1988).

* cited by examiner

Primary Examiner—Harold Pyon
Assistant Examiner—Emmanuel S. Luk
(74) Attorney, Agent, or Firm—Wayne C. Jaescke; Stephen D. Harper; Kenneth Watov

(57) ABSTRACT

A locking and opening device for an injection moulding die, particularly for processing highly liquid melted plastic material, provides a technically simple, low cost mechanism to lock the die and limit elements located above workbench level or mould level, when the device is arranged vertically. To achieve this, clamping pins hold one moulding die in a closed position in relation to an overlying moulding die and which can be axially displaced into a closed or open position by means of a sliding element associated with each clamping pin.

6 Claims, 2 Drawing Sheets

INJECTION MOULDING DIE LOCKING AND OPENING DEVICE

BACKGROUND

1.0 Field of the Invention

This invention relates to a mechanism for locking and opening an injection mold, more particulary for processing low-viscosity molten plastic.

2.0 Discussion of Related Art

Injection molds are available in various forms. For example, it is known, even in the processing of low-viscosity molten plastic, that the upper half of a mold, for example, can be moved downwards by a closing cylinder onto the lower half, and then held under pressure in the closed position, with pressures of 6,000 to 7,500 N being applied. It is also possible to assemble a casting mold by hand via a drawer system and then insert it into clamps which lock the mold halves and fix them in relation to an injection nozzle.

It is also known that mold halves can be guided on slide elements for opening and closing, and kept in the closed position by toggle levers. If closing cylinders, toggle levers or the like are used, comparatively high outlay for equipment is involved. In addition, space has to be created for the closing mechanism, for example above a worktable, if the upper mold half is moved by a cylinder into the working position on the lower half and held in that position.

3.0 SUMMARY OF THE INVENTION

An object of the present invention is to provide a technically simple inexpensive mold locking mechanism for substantially eliminating the need for elements above the worktable level or in front of a vertically arranged mold plane.

The above object and other objects are provided in accordance with the invention by clamping pins which hold one part of the mold in the closed position relative to the other part and which are each designed for axial displacement by an associated slide element into either a closed position, or into an open position.

The locking of the mold halves relative to one another by the combination of clamping pins and slide elements actuating the clamping pins the other hand provides for a very simple construction.

The combination of clamping pins and slide elements fixing the clamping pins makes the closure independent of the injection pressures applied. The locking mechanism according to the invention is capable of withstanding very high pressures.

In one embodiment of the invention, the two slide elements are combined to form a forked slide which is mounted for displacement by a drive element, more particularly a pneumatic cylinder. Pneumatic cylinders with a comparatively low closing pressure may be used in accordance with the invention because the pneumatic cylinders are not required to apply a closing pressure. This is done via a cable element or directly through the slide elements.

In a preferred embodiment of the invention, one part of the mold is designed as a lower mold half positioned at worktable level while the other part of the mold is designed as an upper mold half, the forked slide and its drive being arranged below worktable level.

This arrangement enables the working plane to be kept substantially free from mold closing or actuating elements so that considerable freedom of movement is available as there is no need for conventional positive locking mechanisms.

In another embodiment of the invention, the slide elements are formed with longitudinal slots which merge into a widened region that allows a head element on each clamping pin to pass through.

Another particularly advantageous embodiment is characterized in that, on one side, each slide element has a ramp which moves the clamping pin into the closed position and, on the other side, a ramp which moves the clamping pin into the open position.

This construction according to the invention provides not only for optimal closing of the mold halves, but also for simple opening because the mold automatically undergoes a minimal lifting movement via the ramp for movement into the opening position which considerably simplifies removal of the molding.

BRIEF DESCRIPTION OF THE DRAWINGS

The invention is explained in more detail in the following with reference to the accompanying drawings, in which like items are identified by the same reference designation, wherein.

DETAILED DESCRIPTION OF THE INVENTION

Figure 1:
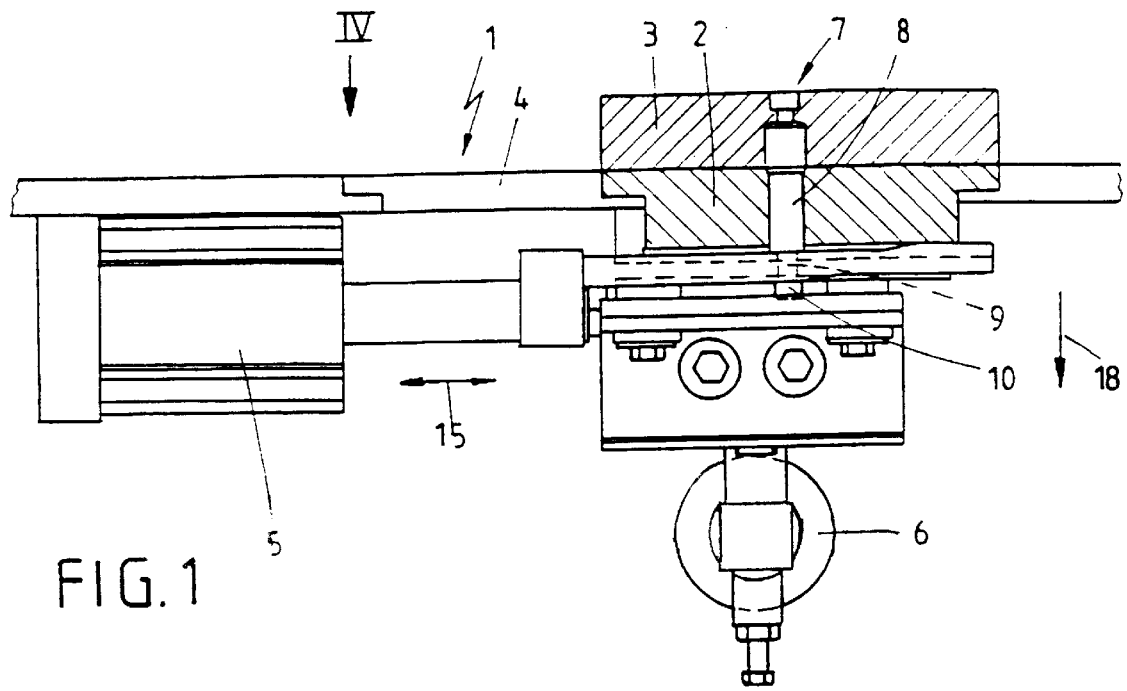
FIG. 1 is a side elevational view, partly in section, with the injection mold in the closed position.

In the illustrated examples, the mechanism generally denoted by the reference 1 is formed by a mold lower half 2 and a mold upper half 3 with the parting plane at the level of a worktable 4 and by a pneumatic cylinder 5 and a nozzle 6 for injecting plastic into the mold lower half.

Figure 3:
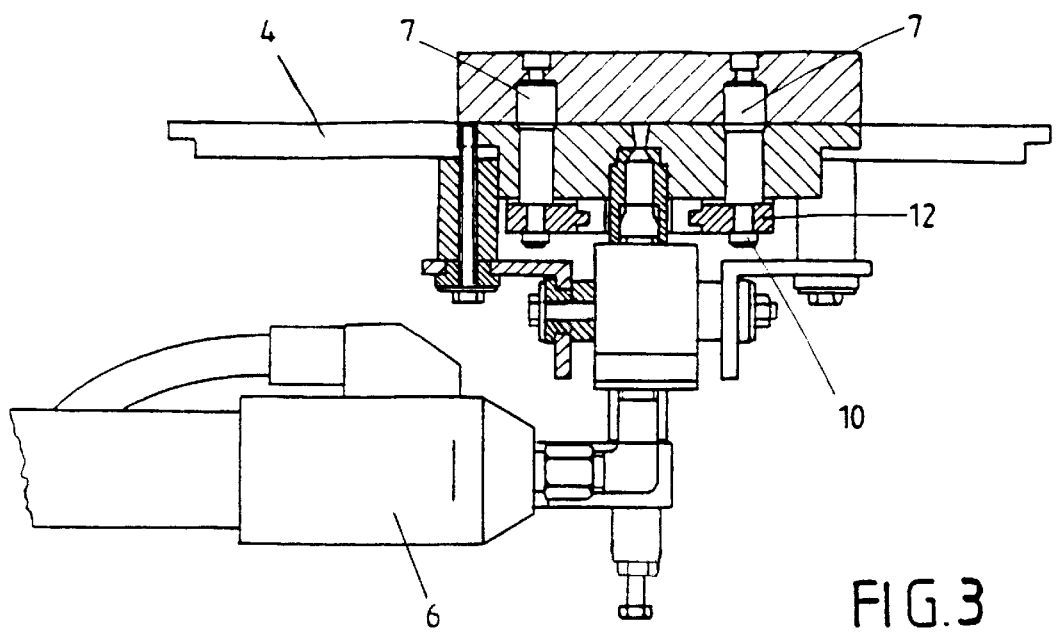
FIG. 3 is a partial cross-sectional view taken perpendicularly of the sections of FIGS. 1 and 2.
Figure 4:
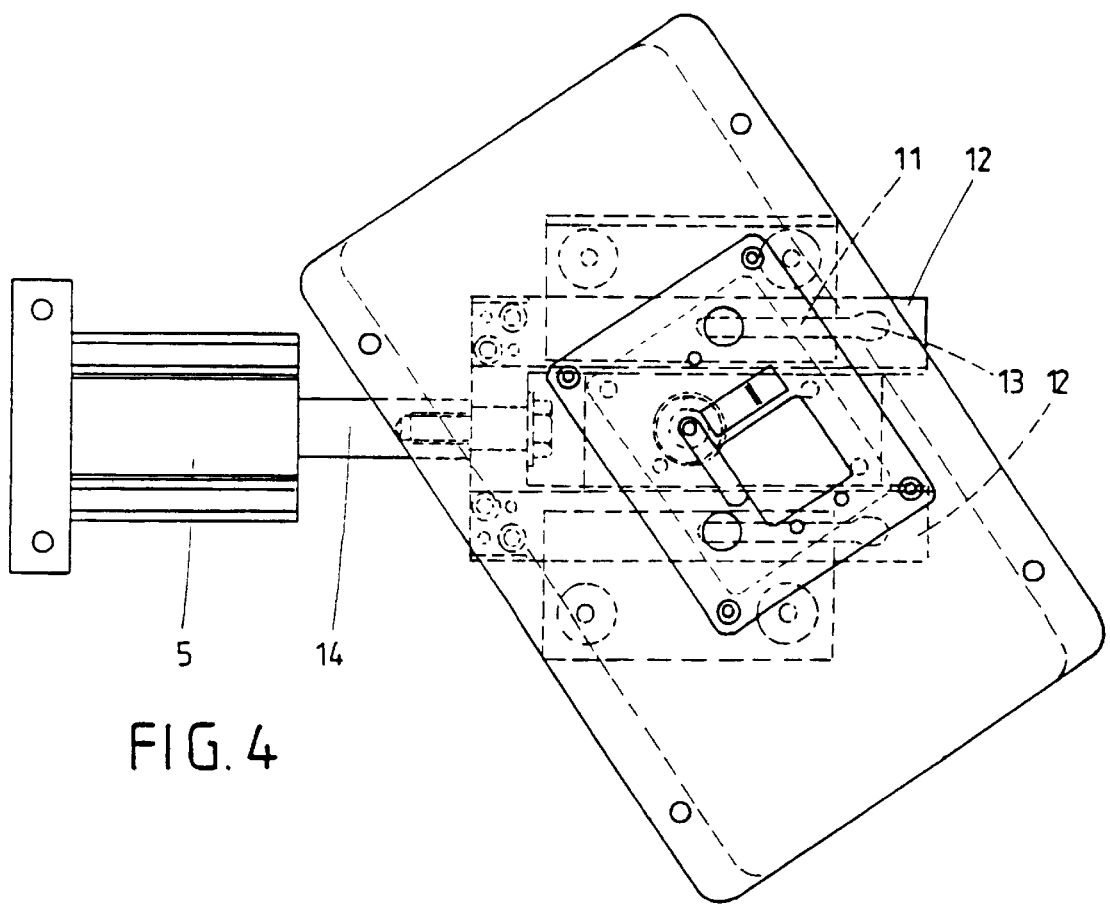
FIG. 4 is a view from above in the direction of arrow IV in FIG. 1 partly broken away.

In the illustrated example, two clamping pins 7 are provided in the mold upper half 3, the shank 8 of each clamping pin passing slidingly through the mold lower half 2. The clamping pins 7 comprise a guide neck 9 and a head 10, the guide neck 9 being guided in a slot guide 11 of a slide element generally denoted by the reference 12, (see FIGS. 3 and 4) the slot 11 merging into a widened opening 13 which allows the head 10 to pass through.

Slide elements 12 are provided for actuating the clamping pins 7, being combined to form a fork (see FIG. 4) and designed for displacement in the direction of the double arrow 15 (FIG. 1) by the hydraulic cylinder 5.

Figure 2:
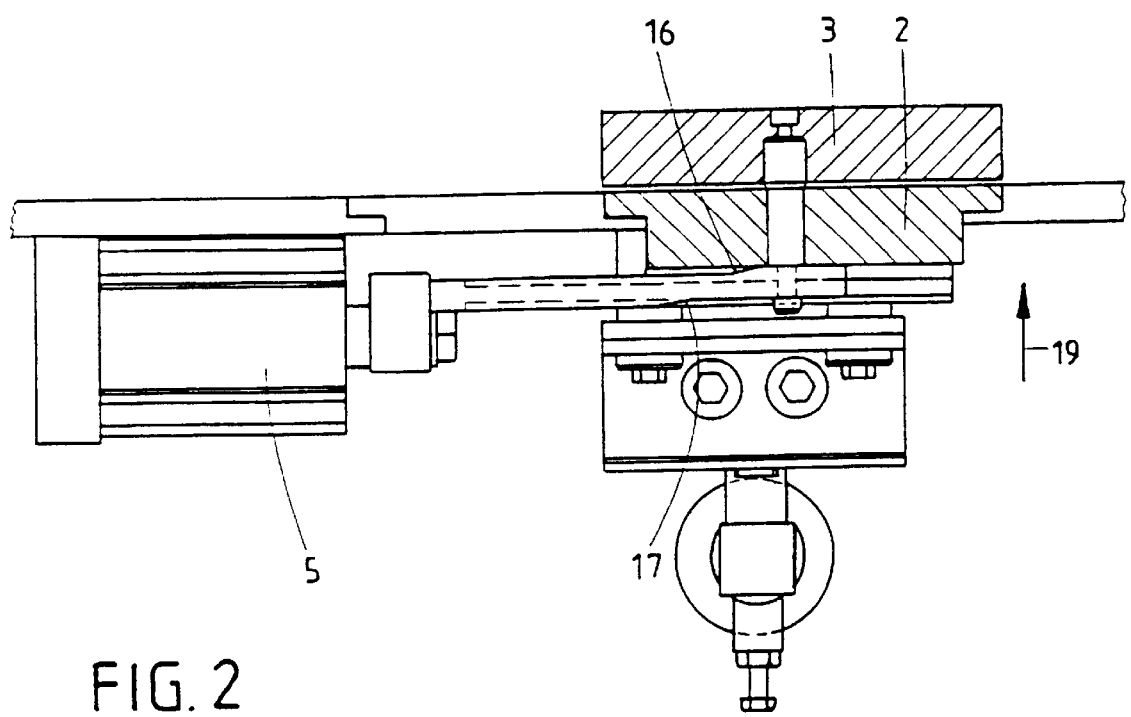
FIG. 2 is a side elevational view, partly in section, with the injection mold in the open position before the upper mold half is removed.

As can be seen from FIGS. 1 and 2 in particular, each slide element 12 has an upper ramp 16 and a lower ramp 17 of which the effect is that the head 10 in FIG. 1 is moved downwards in the direction of the arrow 18 via the lower ramp 17 and upwards in the direction of the arrow 19 via the ramp 16. In the event of a downward movement in the direction of arrow 18, the two mold halves 2 and 3 are locked. If the clamping pin 7 is moved upwards in the direction of arrow 19 via the ramp 16, the mold halves move slightly, for example by only 2 mm, into the open position shown in FIG. 2. At the same time, the molding is loosened.

If the ram 14 (see FIG. 4) is located in the end position shown in FIG. 2, the head 10 aligns with the widened part 13 of the slot 11 so that the upper mold half 3 can be lifted upwards without difficulty either by hand or automatically.

The embodiment of the invention described in the foregoing can of course be modified in many respects without departing from the basic concept. For example, the two ramps 16 and 17 with the slot guide 11 and the widened opening 13 may be arranged on segments of a rotatable disk which is rotated below the worktable level. Other modifications are also possible, which modifications are meant to be covered by the spirit and scope of the appended claims.

What is claimed is:

1. A mechanism for closing and opening an injection mold, for processing low-viscosity molten plastic, comprising:

a mold including an upper half mold section separable from a lower half mold section, each having top and bottom faces;

first and second clamping pins that are vertically oriented and spaced apart, each having an upper portion retained in said upper half mold section, a mid-shank portion passing slidably through said lower half mold section, a narrowed guide neck portion immediately following said mid-shank portion and protruding from the bottom face of said lower half mold section, and a head portion following and terminating the associated narrower mid-shank portion;

first and second slide elements spaced apart and horizontally movable relative to said first and second clamping pins, said first and second slide elements each including a longitudinal slot portion slidably and captively retainable on said guide neck between said mid-shank portion and said head portion of an individual one of said first and second clamping pins, respectively; and said first and second slide elements each further including top and bottom portions, an upper ramp on the top portion, and a lower ramp on the bottom portion displaced from the location of the upper ramp, whereby said first and second slide elements are moved in one direction for causing respective said lower ramps to engage the heads of said first and second clamping pins, respectively, for moving the latter vertically downward to move the upper half mold section into locking engagement with the lower half mold section, and when thereafter said first and second slide elements are moved in an opposite direction respective said lower ramps move away from associated head portions of said first and second clamping pins, followed by respective said upper ramps engaging ends of the associated mid-shank portion of said first and second clamping pins, respectively, for moving the latter vertically upward to move the upper half mold section away from the lower mold section.

2. A mechanism as claimed in claim 1, wherein said first and second slide elements consist of slide arms configured to form a forked slide which is mounted for displacement by a drive element.

3. A mechanism as claimed in claim 2, wherein said lower half mold section is positioned at a worktable level, and the upper half mold section, with the forked slide and its drive are arranged below worktable level.

4. A mechanism as claimed in claim 2, wherein the longitudinal slots of the first and second slide elements each merge into a widened region that allows said head portion on each of said first and second clamping pins respectively, to pass through.

5. A mechanism as claimed in claim 2, wherein said drive element includes a pneumatic cylinder.

6. A mechanism as claimed in claim 3, wherein the longitudinal slots of said first and second slide elements each merge into a widened region that allows said head portion on each of said first and second clamping pins to pass through.

* * * * *

UNITED STATES PATENT AND TRADEMARK OFFICE
CERTIFICATE OF CORRECTION

PATENT NO.     : 6,220,848 B1
DATED          : April 24, 2001
INVENTOR(S)    : Kaselow et al.

It is certified that error appears in the above-identified patent and that said Letters Patent is hereby corrected as shown below:

<u>Title page,</u>
Item [73], Assignee:, delete "Schmelzgusstecgnik"; and insert therefor
-- Schmelzgusstechnik --.

<u>Column 4,</u>
Line 29, insert a -- , -- after the word "pins".

Signed and Sealed this

Twenty-ninth Day of April, 2003

JAMES E. ROGAN
*Director of the United States Patent and Trademark Office*